Figure 1:
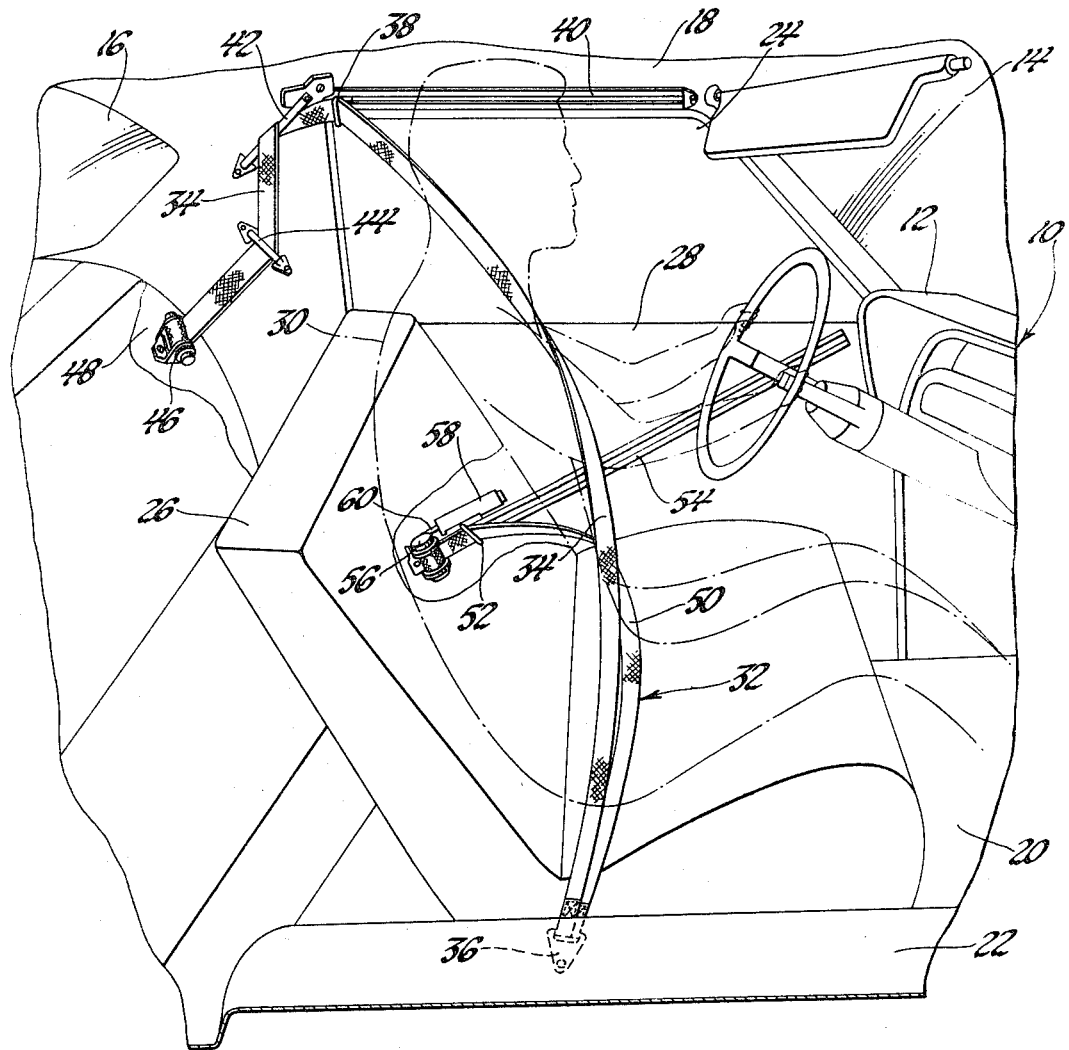

United States Patent

Keppel et al.

[15] 3,680,883
[45] Aug. 1, 1972

[54] VEHICLE PASSIVE OCCUPANT RESTRAINING BELT ARRANGEMENT

[72] Inventors: Charles M. Keppel, Madison Heights; Irwin K. Weiss, Birmingham, both of Mich.

[73] Assignee: General Motors Corporation, Detroit, Mich.

[22] Filed: Feb. 25, 1971

[21] Appl. No.: 118,605

[52] U.S. Cl. ................................280/150 SB
[51] Int. Cl. ...................................B60r 21/02
[58] Field of Search .....................280/150 SB

[56] References Cited

UNITED STATES PATENTS

| | | | |
|---|---|---|---|
| 3,583,726 | 6/1971 | Linblad | 280/150 SB |
| 3,415,538 | 12/1968 | Radke | 280/150 SB |
| 3,351,382 | 11/1967 | Davies | 280/150 SB |

*Primary Examiner*—Benjamin Hersh
*Assistant Examiner*—Robert R. Song
*Attorney*—W. E. Finken and Herbert Furman

[57] ABSTRACT

A vehicle passive occupant restraining belt arrangement includes shoulder and lap belts having their first respective ends fixed with respect to the vehicle body inboard of the seat. The other end of the shoulder belt is received by a conventional inertia retractor mounted rearward of the seat adjacent the outboard side of the vehicle body and normally retracting the shoulder belt to a suitable occupant restraining position diagonally disposed across the chest of a seated occupant. The other end of the lap belt is received by a releasable automatic locking retractor mounted on the inboard lower rear portion of the vehicle body door and normally retracting the lap belt to a suitable occupant restraining position disposed across the lap of the seated occupant. An elongated first track member mounted along the roof rail of the vehicle body slidably mounts a first carrier that is apertured to slidably receive an intermediate portion of the shoulder belt. An elongated second track member is angularly disposed on the inboard side of the door with the rear end adjacent the locking retractor and with the front end positioned above the rear end adjacent the front edge of the door. A second carrier is mounted by the second track member for longitudinal movement and is apertured to slidably receive an intermediate portion of the lap belt. Conventional drive mechanisms move the carriers with respect to the track members in response to an operative condition of the vehicle. When the vehicle is in the operative condition, the drive mechanisms position the carriers at the rear ends of the track members and the shoulder and lap belts are disposed in the occupant restraining positions. Upon cessation of the operative condition of the vehicle, a solenoid releases the locking retractor and the drive mechanisms subsequently move the carriers to the front ends of the track members as the belts slide through the carriers and move to easy-enter positions allowing convenient egression of the occupant from the vehicle body. Upon an occupant again assuming a seated position and the vehicle being placed in the operative condition, the drive mechanisms move the carriers to the rear ends of the track members to allow the belts to again assume the occupant restraining positions.

1 Claim, 2 Drawing Figures

PATENTED AUG 1 1972                                    3,680,883

INVENTORS
Charles M. Keppel &
BY Irwin K. Weiss

Herbert Furman
ATTORNEY

VEHICLE PASSIVE OCCUPANT RESTRAINING BELT ARRANGEMENT

This invention relates to a vehicle passage occupant restraining belt arrangement.

It is well known to provide a vehicle passive occupant restraining belt arrangement in which a belt has an end fixed to a carrier slidably mounted on a vehicle body door with the carrier sliding forward to move the belt to an easy-enter position during door opening movement and sliding rearward to move the belt to an occupant restraining position during door closing movement. It is also well known to provide a passive occupant restraining belt arrangement in which a belt has an end received by a retractor mounted on a vehicle body door.

This invention provides a vehicle passive occupant restraining belt arrangement in which a pair of carriers slidably receive respective intermediate portions of shoulder and lap belts and move the belts between easy-enter and occupant restraining positions in response to an operative condition of the vehicle.

In the preferred embodiment of the invention, the belt arrangement includes shoulder and lap belts that have their first respective ends fixed inboard of a vehicle seat adjacent the rear end of the seat. The other end of the shoulder belt is received by a conventional inertia retractor and the intermediate portion of the shoulder belt is slidably received within a first carrier that is slidably mounted by an elongated first track member that extends along the vehicle body roof rail. The other end of the lap belt is received by a door mounted releasable automatic locking retractor and the intermediate portion of the lap belt is slidably received by a second carrier that is mounted on an elongated second track member mounted on the door and disposed in an angular position with the rear end of the track member adjacent the locking retractor and the front end above the rear end. Conventional drive mechanisms position the carriers adjacent the rear ends of the track members when the vehicle is in an operative condition with the shoulder belt being disposed angularly across the chest of a seated occupant and with the lap belt disposed over the lap of the seated occupant. Upon cessation of the operative condition of the vehicle, a solenoid releases the locking retractor and the drive mechanisms subsequently move the carriers to the front ends of the track members as the belts slide the carriers and are moved to easy-enter positions allowing convenient occupant egression from the vehicle body. When an occupant again assumes a seated position and the vehicle is placed in the operative condition, the drive mechanisms move the carriers to the rear ends of the track members and the belts are again disposed in the restraining positions.

Accordingly, an object of this invention is to provide a vehicle passive occupant restraining belt arrangement which includes roof rail and door mounted first and second carriers that respectively slidably receive shoulder and lap belts and move the belts between occupant restraining and easy-enter positions in response to an operative condition of the vehicle.

Another object of this invention is to provide such a belt arrangement in which the shoulder belt has one end received by a vehicle body mounted inertia retractor and the lap belt has one end received by a door mounted releasable automatic locking retractor that is released upon cessation of the operative condition of the vehicle.

Figure 2:
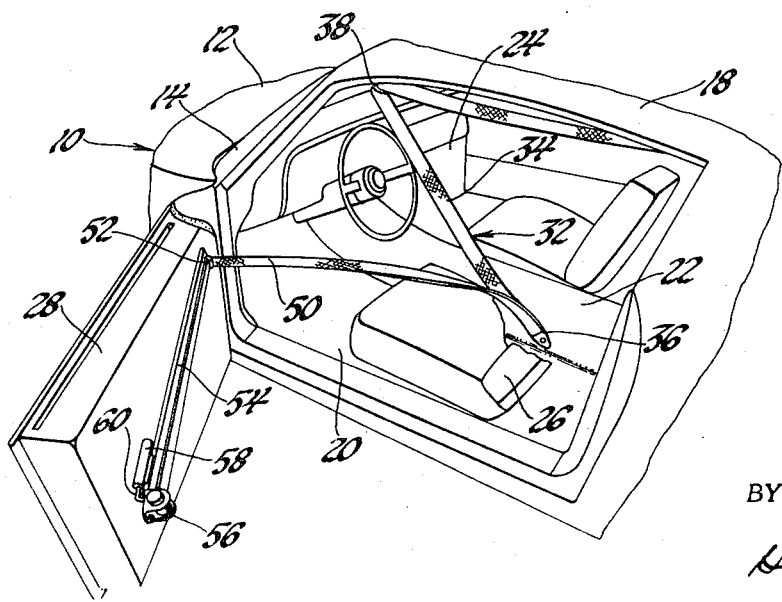

These and other objects of this invention will be readily apparent from the following detailed description and drawings in which:

FIG. 1 is a perspective view of the interior of a portion of a vehicle that includes a belt arrangement according to the invention with the belts shown in occupant restraining positions with respect to a phantom line indicated seated occupant; and FIG. 2 is a partially broken away perspective view of a portion of the vehicle with the belts shown in easy-enter positions and with the vehicle body door shown in open position.

Referring now to the drawings, a vehicle generally indicated at 10 includes a conventional vehicle body 12 having the usual front windshield 14 and rear window 16. The vehicle body roof 18 and the vehicle body floor 20 with the conventional transmission tunnel 22 cooperate to define an occupant compartment 24 in which is conventionally mounted a vehicle seat 26. Access to the occupant compartment 24 is by way of a vehicle body door opening that is conventionally opened and closed by a vehicle body door 28 whose front edge is pivoted to the vehicle body 12.

As shown in FIG. 1, a phantom line indicated seated occupant 30 is restrained in seated position by a belt arrangement according to the invention and generally indicated by 32. Belt arrangement 32 includes a shoulder belt 34 whose one end is fixed adjacent the inboard lower rear portion of the seat 26 by a bracket 36 conventionally secured to the transmission tunnel 22. In the restraining position, the shoulder belt 34 extends diagonally across the chest of the seat occupant 30 and from there extends rearwardly such that an intermediate portion of the shoulder belt 34 is slidably received within an aperture or slot in a carrier 38 that is mounted for longitudinal movement by a track member 40 conventionally secured to the roof 18 adjacent the upper edge of the vehicle body door opening. From the carrier 38, the shoulder belt 34 extends rearwardly and slides over an angularly disposed roof mounted roller 42 and from there extends downwardly and slides over an angularly disposed roof mounted roller 44 from which the belt extends downwardly and to the rear to be received by a conventional inertia retractor 46 mounted on the vehicle body rear wheel well 48 in a conventional manner. Belt arrangement 32 also includes a lap belt 50 whose one end is fixed by bracket 36 to the transmission tunnel 22 and which extends across the lap of the seated occupant 30 in the FIG. 1 occupant restraining position. An intermediate portion of the lap belt 50 is received within an aperture of slot in a carrier 52 mounted for longitudinal movement with respect to a diagonally oriented track member 54 which is mounted on the door 28 in a conventional manner with the front end above the rear end. The lap belt 50 extends rearwardly and downwardly from carrier 52 and is received by a releasable automatic locking retractor 56 fixedly mounted on door 28 in a conventional manner adjacent the rear end of track member 54. A solenoid 58 includes an armature arm 60 connected to locking retractor 56 to release the locking retractor upon actuation of the solenoid, as will be described.

Conventional drive mechanisms, not shown, are connected to the carriers 38 and 52 in a suitable manner and move the carriers between the FIG. 1 positions adjacent the rear ends of track members 40 and 54, respectively, and the FIG. 2 positions adjacent the front ends of the track members. During this movement, the retracting bias of retractors 46 and 56 maintains the belts in a taut condition as the belts slide through the respective slots in carriers 38 and 52 to allow the movement of the belt arrangement between the FIG. 1 occupant restraining position and the FIG. 2 easy-enter position.

The operation of a vehicle including a belt arrangement 32 is as follows:

An occupant enters the vehicle 10 through the vehicle body door opening with the door 28 in open position and the shoulder belt 34 and the lap belt 50 in the FIG. 2 generally V-shaped easy-enter positions due to the positioning of the carriers 38 and 52 at the front ends of the respective track members. When the occupant has assumed a seated position, the occupant's right arm will be positioned inboard of shoulder belt 34 while the left arm will be positioned outboard of the shoulder belt. Since the carrier 52 is located closer to the bracket 36 in the door closed position than in the door open position, closing movement of the door 28 will cause retractor 56 to retract the lap belt 50 to maintain a taut belt condition. When occupant places the vehicle 10 in an operative condition, the drive mechanisms are actuated in a rearward driving direction and move the carriers 38 and 52 from the FIG. 2 positions adjacent the front ends of track members 40 and 54, respectively, to the FIG. 1 positions adjacent the rear ends of the track members 40 and 54, respectively. During this movement, the retractors 46 and 56 retract the respective belts 34 and 50 to maintain the belts in a taut condition and when the carriers reach the rearward positions, the belts 34 and 50 are positioned in the occupant restraining positions of FIG. 1 without any effort on the part of the occupant.

It should be pointed out that there are many possibilities for the operative condition of the vehicle 10 which causes the rearward movement of the carriers 38 and 52 and the consequent movement of the belts 34 and 50 to the occupant restraining positions. Ignition of the vehicle 10 is one of the possibilities for this operative condition. Similarly, it is also possible for the operative condition to be the ignition of the vehicle 10 and subsequent placing of the vehicle in one of the selected drive positions. It is also possible to cause the movement of the belts 34 and 50 to the occupant restraining positions upon closing movement of the door 28 such that whenever an occupant assumes a seated position with the door closed, the occupant will be restained by the belt arrangement 32 while forward movement of the occupant to actuate the vehicle controls for ignition is allowed at a controlled rate in a conventional manner by inertia retractor 46.

Upon cessation of the operative condition of the vehicle 10, the solenoid 58 is actuated by a suitable control circuit to release the locking retracting 56 and, subsequently, the drive mechanisms are actuated in a forward driving direction to move the carriers 38 and 52 from the rear ends of the track members 40 and 54 to the front ends of the track members as the belts 34 and 50 are thus moved to the FIG. 2 easy-enter positions, the movement of carrier 38 of course being below a rate which will lock inertia retractor 46. The occupant is then allowed convenient egression from the vehicle body 12 upon opening movement of the door 28.

The invention thus provides an improved vehicle occupant restraining belt arrangement for restraining a seated occupant in response to an operative condition of the vehicle and requiring no effort on the part of the occupant.

We claim:

1. In combination with a vehicle including a vehicle body having a floor and a roof defining an occupant compartment in which is mounted a vehicle seat accessible through a vehicle body door opening selectively opened and closed by a vehicle body door whose forward edge is pivoted to the vehicle body, a passive occupant restraining belt arrangement comprising, a shoulder belt having one end secured within the occupant compartment adjacent a rear inboard lower portion of the vehicle seat, an inertia retractor fixedly mounted to the vehicle body within the occupant compartment rearward of the seat and adjacent an outboard portion thereof, the inertia retractor receiving the other end of the shoulder belt and normally retracting the shoulder belt to a suitable occupant restraining position diagonally disposed across the chest of a seated occupant, a lap belt having one end secured within the occupant compartment adjacent the one end of the shoulder belt, a releasable automatic locking retractor mounted on the inboard lower rear portion of the door, the locking retractor receiving the other end of the lap belt and normally retracting the lap belt to a suitable occupant restraining position disposed across the lap of a seated occupant, releasable means for releasing the locking retractor, a first track member mounted on a outboard portion of the roof in a generally longitudinally extending direction within the occupant compartment, an apertured first carrier mounted by the first track member for longitudinal movement with respect thereto, the aperture of the first carrier slidably receiving an intermediate portion of the shoulder belt and the first carrier being positioned in a rearward position adjacent the rear end of the seat with the shoulder belt in restraining position, a second track member mounted on the inboard side of the door in a diagonal orientation with the rear end positioned adjacent the locking retractor and with the front end positioned above the rear end adjacent the front edge of the door, an apertured second carrier mounted by the second track member for longitudinal movement with respect thereto, the aperture of the second carrier slidably receiving an intermediate portion of the lap belt and the second carrier being positioned in a rearward position adjacent the locking retractor with the lap belt in restraining position, drive means for moving the carriers between the rearward positions and respective forward positions as the belts slide through the carriers to move the belts between the restraining positions and easy-enter positions allowing convenient occupant access to the vehicle seat, and control means for actuating the drive means to move the carriers to the rearward positions and the belts to restraining positions in response to an operative condition of the vehicle, the control means actuating the release means to release the locking retractor and subsequently actuating the drive means to move the carriers to the forward positions and the belts to easy-enter positions upon cessation of the operative condition of the vehicle.

* * * * *